March 13, 1962   H. W. ASCHINGER   3,024,757
UNDERWATER TOWED VEHICLE
Filed Aug. 24, 1959
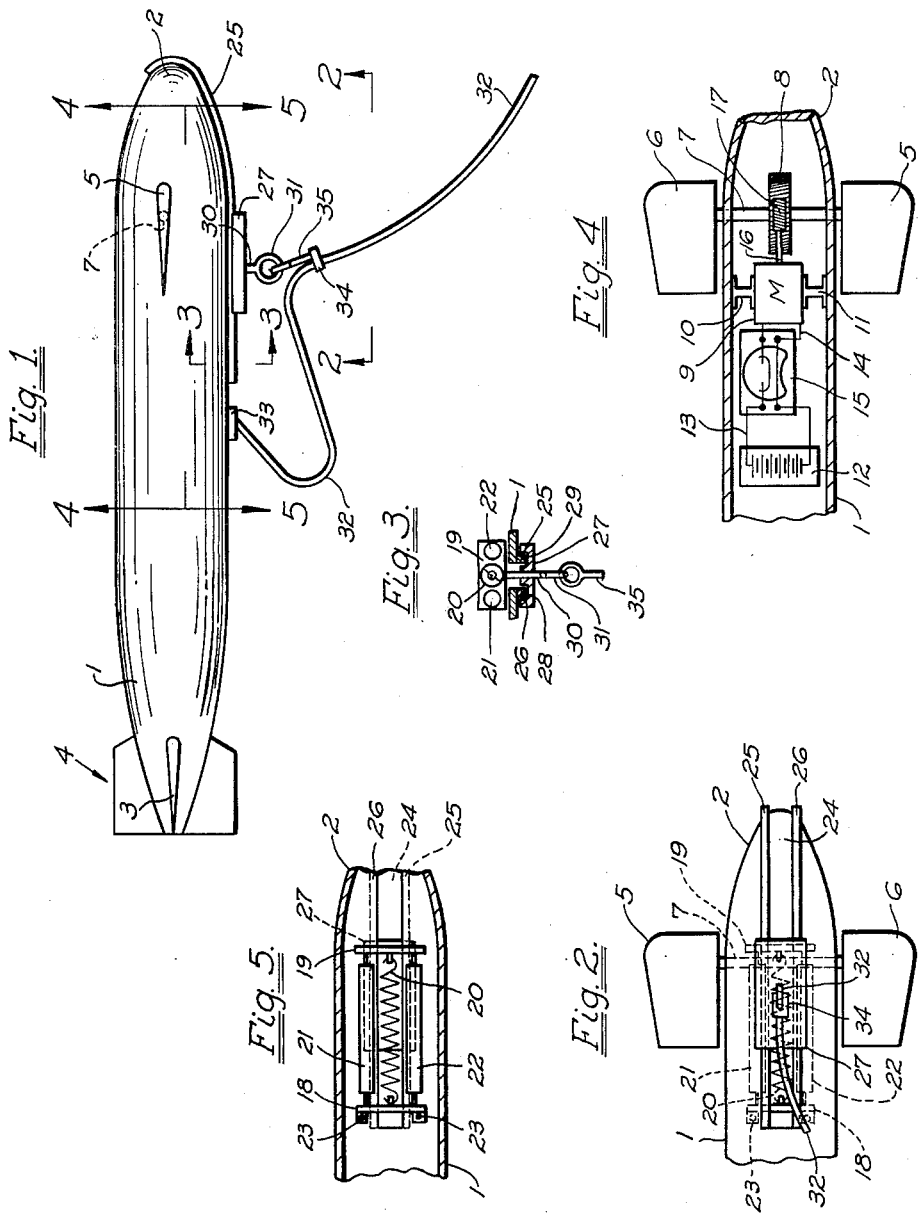
INVENTOR.
Harold W. Aschinger
BY Karl Huber Attorney
John G. _____ Agent

3,024,757
UNDERWATER TOWED VEHICLE
Harold W. Aschinger, Ridgefield, N.J., assignor, by mesne assignments, to Vare Industries, Roselle, N.J., a corporation of New Jersey
Filed Aug. 24, 1959, Ser. No. 835,529
5 Claims. (Cl. 114—235)

The present invention deals with an underwater towed vehicle and more particularly with an underwater towed vehicle adapted to automatically adjust its center of drag to compensate for changes in drag resistance caused by a shifting of the center of drag during changes in the speed of travel.

In order to prevent a towed vehicle from travelling erratically, the towing cable attachment on the vehicle should of necessity be located at the center of drag of the vehicle. Since the center of drag shifts with changes in speed of travel, a fixed towing cable attachment on the vehicle will subject the vehicle to travel erratically as a result of the center of drag shifting from the location of the cable attachment.

The present invention deals with an underwater towed vehicle capable of maintaining equilibrium during underwater travel at various rates of speed.

It is an object of the invention to provide an underwater vehicle having adjustable means for automatically shifting the cable attachment in accordance with the shifting of the center of drag of the vehicle.

It is another object of the present invention to provide an underwater vehicle adapted to maintain equilibrium during underwater travel at various rates of speed and during the shifting of its center of drag.

Other objects and advantages of the invention will become apparent from the description hereinafter following and the drawings forming a part hereof, in which:

FIGURE 1 illustrates a side elevational view of the towed vehicle according to the invention, FIGURE 2 illustrates a fragmentary bottom view along lines 2—2 of FIGURE 1, FIGURE 3 illustrates a fragmentary sectional view along lines 3—3 of FIGURE 1, FIGURE 4 illustrates a fragmentary sectional view along lines 4—4 of FIGURE 1, and FIGURE 5 illustrates a fragmentary sectional view along lines 5—5 of FIGURE 1.

Regarding the illustrations, the vehicle is in the form of an elongated substantially tubular body 1 having a bow 2 and tapered stern 3. The stern is provided with stabilizer means 4. Hydrofoils 5 and 6 are mounted on opposite sides of the vehicle 1 by means of a rotatable shaft 7 passing transversally through the vehicle and spaced rearwardly of the bow 2. A worm wheel 8, as shown by FIGURE 4, is mounted on shaft 7 internally of the body 1. The body 1 contains reversible motor 9 secured to its internal walls by means of supports 10 and 11. The motor is operated by a source of electrical energy 12 inside the body 1 and connected to the motor by conductors 13 and 14 with a switch 15 connected across the conductors. A motor shaft 16, with a worm gear 17 on an end thereof, extends outwardly of the motor with the worm gear 17 engaging the worm wheel 8. The switch 15 is a pendulum type or gravity type switch, e.g. a gravity sensing electrolytic potentiometer. As the vehicle or body 1 deviates from the horizontal, the switch operates to select the direction of the rotation of the motor, whereby the worm 17 together with worm wheel 8 rotates the shaft 7 and consequently the hydrofoils 5 and 6 to keep the vehicle at a substantially even keel.

According to FIGURE 5, the hollow body 1 also contains a drag compensator assembly comprising a pair of spaced plates 18 and 19 with a yieldable or spring means 20 connected therebetween. In addition, a pair of hydraulic shock absorbers 21 and 22 are connected between the plates 18 and 19, one on each side of spring 20. One of the plates 18 is fixed to the body 1 by bolts 23, the other plate 19 is slidable axially of spring 20 under and spring tension on the inner surface of the body 1.

Regarding FIGURES 1, 2 and 3, the body 1 is provided with a longitudinal slot 24 through the bottom wall of the body 1, extending from the bow 2 and rearwardly partly along the length of the body 1. A pair of tracks 25 and 26 are mounted on both sides of the slot and being coextensive therewith. A carriage 27 having paralleled grooves 28 and 29 is mounted on the tracks 25 and 26 with the tracks engaging the grooves. A cable compensator attachment 30 in the form of a rod with a terminal ring 31 is mounted through the carriage 27 with its ring below the carriage and its other end passing through the slot 24 and secured to the slidable drag compensator plate 19. A cable 32 is secured to the bottom of the body 1 at the fixed cable attachment block 33. A cable retaining means 34 is secured to the cable and to the terminal ring 31 by means of a link 35. The retaining means is positioned at a point along the cable length which permits sufficient cable slack between the fixed attachment 33 and the compensator attachment ring 31.

In operation, as the vehicle is being towed the center of drag normally shifts forwardly toward the bow 2 with increasing towing speed. The increased tension on the cable is transmitted to the compensator assembly through rod 30, and the carriage 27 together with the attachment rod 30 moves forwardly at a rate corresponding to the shift of the center of drag, the center of drag at all times corresponding with the position of the attachment rod 30, whereby the compensator rod is automatically adjustable to maintain the cable at the center of drag.

When the speed is reduced, the center of drag moves rearwardly and the compensator rod 30 follows accordingly to shift the cable to the new center of drag. While the spring means 20 operates the movement of the compensator plate 19, the spring would normally react to cable vibration components but the shock absorbers coact with spring 20 to reduce the vibration effect and provide for a smooth shifting of the compensator rod 30.

Various modifications of the invention are contemplated within the scope of the appended claims.

What is claimed is:

1. An underwater towed vehicle comprising an elongated hollow body having a bow and a stern, hydrofoil means secured to the body rearwardly of the bow and stabilizer means at the stern, the body having an elongated slot through the wall thereof and extending from the bow toward the stern, a compensator assembly within the body, the compensator assembly comprising a fixed member secured to the internal wall of the body and a second slidable member, yieldable means interconnecting the members, cable attachment means connected to the slidable member and extending outwardly of said slot.

2. An underwater towed vehicle according to claim 1, comprising a pair of laterally spaced tracks on the external wall of the body adjacent to and along the slot, said slidable member including a carriage mounted on the tracks and connected to said attachment means.

3. An underwater towed vehicle according to claim 1, comprising a reversible motor internally of the body, a source of electrical energy contained by said body, conductors leading from said source to said motor, switch means connected across said conductors, a shaft connecting said hydrofoil means through said body, and linkage means connecting the motor to the shaft.

4. An underwater towed vehicle according to claim 1, comprising shock absorber means interconnecting said first and second members.

5. An underwater towed vehicle comprising an elongated hollow body having a bow and a stern, hydrofoil means secured to the body rearwardly of the bow and stabilizer means at the stern, the body having an elongated slot through the wall thereof and extending from the bow toward the stern, a compensator assembly within the body, the compensator assembly comprising a fixed member secured to the internal wall of the body and a second slidable member, yieldable means interconnecting the members, cable attachment means connected to the slidable member and extending outwardly of said slot, and a fixed cable attachment on said body spaced rearwardly of said cable attachment means.

References Cited in the file of this patent
UNITED STATES PATENTS

| | | |
|---|---|---|
| 1,690,578 | Hammond | Nov. 6, 1928 |
| 2,411,156 | Grimminger | Nov. 19, 1946 |